US010303420B2

(12) United States Patent
Harris et al.

(10) Patent No.: US 10,303,420 B2
(45) Date of Patent: May 28, 2019

(54) PROACTIVE STAGED DISTRIBUTION OF DOCUMENT ACTIVITY INDICATORS

(71) Applicant: Microsoft Technology Licensing, LLC, Redmond, WA (US)

(72) Inventors: Andrew Woodruff Harris, Quincy, MA (US); Manoj Sharma, Winchester, MA (US); Maura Fitzgerald, Swampscott, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 119 days.

(21) Appl. No.: 15/585,136

(22) Filed: May 2, 2017

(65) Prior Publication Data
US 2018/0321889 A1 Nov. 8, 2018

(51) Int. Cl.
*G06F 3/147* (2006.01)
*G06F 17/24* (2006.01)
(Continued)

(52) U.S. Cl.
CPC .............. *G06F 3/147* (2013.01); *G06F 16/93* (2019.01); *G06F 17/24* (2013.01);
(Continued)

(58) Field of Classification Search
CPC .... G06F 3/147; G06F 17/30011; G06F 17/24; G06F 3/0482; G06F 21/552; H04L 67/42; H04L 67/22
See application file for complete search history.

(56) References Cited

U.S. PATENT DOCUMENTS 9,477,574 B2    10/2016  Tumanov et al.
2006/0053380 A1*  3/2006  Spataro ............. G06F 17/30011
                                                           715/753
(Continued)

FOREIGN PATENT DOCUMENTS

GB         2499097 A      8/2013

OTHER PUBLICATIONS

Cai, et al., "Personalized Document Re-ranking Based on Bayesian Probabilistic Matrix Factorization", In Proceedings of the 37th international ACM SIGIR conference on Research & development in information retrieval, Jul. 6, 2014, 4 pages.
(Continued)

*Primary Examiner* — Jeffrey A Gaffin
*Assistant Examiner* — Ayesha E Huertas Torres
(74) *Attorney, Agent, or Firm* — The Watson I.P. Group, PLC; Vladan M. Vasiljevic

(57) ABSTRACT

To enable prompt presentation of a user interface that displays documents that other users have accessed or edited, distribution of document activity indicators is performed in a proactive manner such that the document activity indicators are already available at a time when such a user interface is to be presented. Document activity triggers the creation of corresponding document activity identifiers, which are distributed to the workspaces of one or more users in accordance with document activity itself, the type of activity, the user performing the activity, a user who initially created the document, or combinations thereof. When another user utilizes a content creation computer application program, the activity by other users is selectively reflected within the user interface presented by such a content creation computer application program.

20 Claims, 9 Drawing Sheets

(51) Int. Cl.
   *H04L 29/08*    (2006.01)
   *H04L 29/06*    (2006.01)
   *G06F 17/30*    (2006.01)
   *G06F 16/93*    (2019.01)
   *G06Q 10/10*    (2012.01)

(52) U.S. Cl.
   CPC ....... *G06F 17/30011* (2013.01); *G06Q 10/10* (2013.01); *G06Q 10/101* (2013.01); *H04L 67/22* (2013.01); *H04L 67/42* (2013.01)

(56) References Cited

U.S. PATENT DOCUMENTS

| | | |
|---|---|---|
| 2007/0130145 A1 | 6/2007 | Pedersen et al. |
| 2011/0087516 A1 | 4/2011 | Frieden et al. |
| 2012/0296919 A1 | 11/2012 | Sinha et al. |
| 2014/0236964 A1 | 8/2014 | Dalessio et al. |
| 2015/0199347 A1 | 7/2015 | Shnitko et al. |
| 2015/0199361 A1 | 7/2015 | Mcdonnell et al. |
| 2015/0248480 A1 | 9/2015 | Miller et al. |
| 2015/0249715 A1 | 9/2015 | Helvik et al. |
| 2016/0371258 A1 | 12/2016 | Gan et al. |

OTHER PUBLICATIONS

"International Search Report & Written Opinion Issued in PCT Application No. PCT/US2018/026985", dated Jun. 20, 2018, 10 Pages.

\* cited by examiner

US 10,303,420 B2

PROACTIVE STAGED DISTRIBUTION OF DOCUMENT ACTIVITY INDICATORS

BACKGROUND

While the ubiquity of worldwide computer communications networks, such as the Internet, have increased the utilization of computing devices to consume content offered by someone else, computing devices still continue to be utilized as content creation devices, especially within the context of traditional word processing, spreadsheet, presentation, and other like traditional content creation computer application programs. Often, the creation of content through such computer application programs is an iterative and extended process, with users creating, and then subsequently editing, the same document multiple times, whether in a single day, across multiple days, or even across further extended periods of time. Consequently, such content creation computer application programs often present to the user a user interface which enable the user to quickly select the documents that the user was most recently working on.

More recently, content creation computer application programs have facilitated the storage and accessing of documents from centralized document repositories, typically accessed by multiple computing devices through a computer communication network. Such centralized document repositories enable multiple different users to access the same document for purposes of collaborative content creation and editing, and further enable those multiple different users to more easily share documents and content. However, the user interface presented by content creation computer application programs remains focused on the documents that were most recently accessed by the single user to whom that user interface is being presented. Furthermore, such user interfaces are expected to be presented in a prompt and lag-free manner in order to maintain an acceptable user experience. Consequently, a user interface that automatically presents a user with, not only the documents that that specific user most recently accessed, but the documents which have been accessed by, or edited by, other users with whom such a user is affiliated, can be desirable so long as such a user interface can be presented in a sufficiently prompt manner to maintain acceptable user experience.

SUMMARY

To enable prompt presentation of a user interface that displays documents that other users have accessed or edited, distribution of document activity indicators can be performed in a proactive manner such that the document activity indicators are already available at a time when such a user interface is to be presented, thereby avoiding both the delay in polling for such information at the time that the user interface is to be presented, and the corresponding increase in processing and communication effort necessitated by such polling. Document activity triggers the creation of corresponding document activity identifiers, which can be distributed to the workspaces of one or more users in accordance with document activity itself, the type of activity, the user performing the activity, a user who initially created the document, or combinations thereof. When another user utilizes a content creation computer application program, the activity by other users can be reflected within the user interface presented by such a content creation computer application program. The content creation computer application program can retrieve the document activity indicators from its user's workspace, since such document activity indicators can already be waiting there, thereby avoiding the need to poll such information, as well as avoiding the delay associated therewith.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
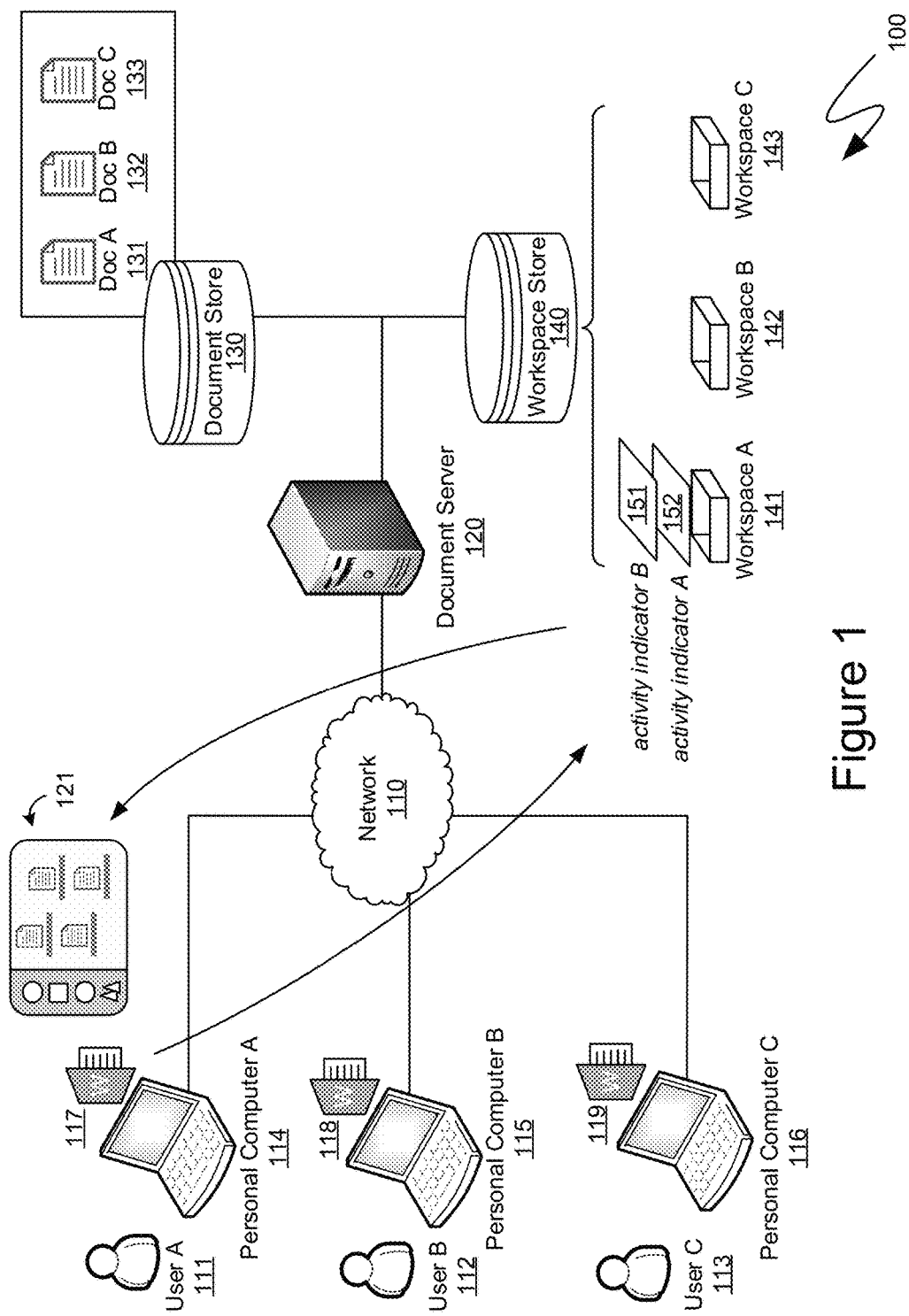
FIG. 1 is a system diagram of an exemplary system illustrating utilization of the proactive distribution of document activity indicators.

The following description relates to the proactive distribution of document activity indicators to multiple user workspaces, including in a proactive manner. To enable prompt presentation of a user interface that displays documents that other users have accessed or edited, distribution of document activity indicators can be performed in a proactive manner such that the document activity indicators are already available at a time when such a user interface is to be presented, thereby avoiding both the delay in polling for such information at the time that the user interface is to be presented, and the corresponding increase in processing and communication effort necessitated by such polling. Document activity triggers the creation of corresponding document activity identifiers, which can be distributed to the workspaces of one or more users in accordance with document activity itself, the type of activity, the user performing the activity, a user who initially created the document, or combinations thereof. When another user utilizes a content creation computer application program, the activity by other users can be reflected within the user interface presented by such a content creation computer application program. The content creation computer application program can retrieve the document activity indicators from its user's workspace, since such document activity indicators can already be waiting there, thereby avoiding the need to poll such information, as well as avoiding the delay associated therewith. In such a manner, content creation computer application programs can present user interfaces that enable users to see which documents their colleagues, friends, family members, or other like collaborators have acted upon recently.

The techniques described herein make reference to a user "workspace". As utilized herein, the term "workspace" means a defined storage location that is unique to the user, or set of users, with which it is correlated. Thus, for example, one example of a user "workspace" as that term is utilized herein, is an email mailbox as stored on one or more server computing devices. Another example of a user workspace can be a user folder or account, such as on a file sharing server. Additionally, while the techniques described herein are described with reference to "documents" they are not limited to specific file structures within which content can be stored, and, thus, they are equally applicable to less strictly defined file structures.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary system 100 is illustrated, providing context for the descriptions below. The exemplary system 100 can include, but is not limited to, one or more user-controlled computing devices, such as the exemplary personal computing devices 114, 115 and 116, illustrated as being utilized by users 111, 112 and 113, respectively. The user controlled computing devices, such as the exemplary personal computing devices 114, 115 116, can be communicationally coupled to one another, and to one or more server computing devices, such as the exemplary document server computing device 120, via a network, such as the exemplary network 110. Consequently, computer application programs executing on the exemplary personal computing devices 114, 115 and 116 can have access to data that is shared among some or all of the users 111, 112 and 113 through the communicational connection to the exemplary document server 120. For example, the exemplary document server 120 can be communicationally coupled to a document store, such as exemplary document store 130, on which can be stored multiple documents, such as the exemplary documents 131, 132 and 133. One or more of the exemplary users 111, 112 and 113 can collaboratively interact with the documents stored by the exemplary document store 130, such as through content creation computer application programs that can execute on each of the exemplary personal computing devices 114, 115 and 116. For example, the exemplary system 100 of FIG. 1 illustrates an exemplary word processing computer application 117 being executed by the user 111 on the personal computing device 114. FIG. 1, likewise, illustrates the exemplary word processing computer applications 118 and 119 being executed by the users 112 and 113 on the personal computing devices 115 and 116, respectively.

Traditionally, user interfaces presented by content creation computer application programs, such as the exemplary word processing computer application programs 117, 118 and 119, include indicators of documents recently accessed by the user to whom the user interface is being presented. Thus, for example, if the exemplary user 111 had last utilized the word processing application 117 to create or edit the document 131, the next time the exemplary user 111 executes the word processing application 117, the word processing application 117 can display user interface, such as the exemplary user interface 121, which can enumerate the document 131, thereby enabling the user 111 to quickly reopen such a document and return to editing it. For example, the exemplary user interface 121 can be an "open" user interface, such as would be presented by an application program, such as the exemplary word processing application program 117, when a user invoked an "open" command in order to select a document to be opened by the application program, such as for viewing or editing. As another example, the exemplary user interface 121 can be a "welcome" user interface, such as would be presented of an application program, such as the exemplary word processing application program 117, when a user first executed, or instantiated, such an application program. As will be recognized by those skilled in the art, such "open" or "welcome" user interfaces often present the user, not only with a graphical user interface through which the user can browse a file hierarchy to select a document, but such user interfaces also often present the user with that user's most recent documents, since users often return to the same documents that they were most recently viewing or editing. Thus, the presentation of such most recent documents improves the user's efficiency in that the user is able to select, with a minimum of effort, such most recent documents.

However, as indicated previously, such most recent documents include only the documents that that user most recently opened or edited. Thus, for example, within the exemplary system 100 of FIG. 1, traditionally, the user interface 121, presented by the word processing application 117 to the user 111 would include only those documents, including documents from the document store 130, that the user 111 previously opened or edited. Traditionally, the exemplary user interface 121 would not include documents that were opened or edited by other users, such as the exemplary users 112 and 113, merely by virtue of their access by those other users. Such a myopic view can result in user inefficiency in collaborative environments. For example, the exemplary user 111 can be working with one or more of the exemplary users 112 and 113 to, for example, collaboratively edit the document 131. Upon completing their edits to the exemplary document 131, the exemplary user 111 can proceed to create, open, edit, or otherwise access other documents, such as the exemplary documents 132 and 133. In the meantime, editing activity on the exemplary document 131 can continue with edits being made by the exemplary users 111 and 112. In such an instance, the exemplary user 111 can be unaware of such activity, since the "open" and/or "welcome" user interfaces presented by, for example, the exemplary word processing application 117 can only show the documents 132 and 133, since they were more recently accessed by the exemplary user 111, even though the document 131 can be the most recently edited document, but for the fact that the edits to the exemplary document 131 can have been made by users other than the exemplary user 111, such as the exemplary users 112 or 113.

One mechanism for generating a user interface, such as the exemplary user interface 121, by a content creation computer application program can be to have the application program poll a server, such as the exemplary document server 120, in order to identify all of the documents, such as within the exemplary document store 130, that have had activity directed to them by at least one of the other users, such as the exemplary users 112 113, or some defined subset thereof. Such polling, however, is far too slow. For example, a user seeking to open a document, with the word processing application program 117, will find delay in presenting the user interface which a user could select and open such a document to be unacceptable, because the potential efficiency to be gained from having documents proactively presented to the user as part of such an "open" interface may not be sufficiently beneficial to justify experiencing such a delay each time the user attempts to open a document. As another example, the user initiating an application program, such as the exemplary word processing application program 117, will perceive any delay in presenting a "welcome" interface to be a product of poor performance in the part of the application instantiation process, which can disincentivize the user from utilizing such an application program.

Consequently, according to one aspect, information sufficient to facilitate the presentation of a user interface, such as the exemplary user interface 121, that can proactively presented to users, not only documents that that specific user previously accessed, but also documents that have had activity directed to them by other users, such information can be already available, such as in a user workspace, and, consequently, can be quickly obtained and utilized to generate a corresponding user interface. For example, the exemplary system 100, shown in FIG. 1, illustrates a workspace store 140 which can be communicationally coupled to the exemplary network 110, such as through the exemplary document server 120, or other server computing devices. The exemplary workspace store 140 can comprise multiple workspaces corresponding to a user, or defined groups of users. For purposes of illustration, the exemplary workspace 141 can correspond to the exemplary user 111. Similarly, the exemplary workspace 142 can correspond to the exemplary user 112 and the exemplary workspace 143 can correspond to the user 113. According to one aspect, the workspaces, such as the exemplary workspaces 141, 142 and 143 can be email mailboxes, such as can be part of an email, calendaring, or other like personal information management server application program. Thus, in such an aspect, the exemplary workspace store 140 can be a database of mailboxes, such as would be maintained by a server email application program. Additionally, in such an aspect, the exemplary workspace store 140 can be communicationally coupled to one or more different server computing devices than the exemplary document server computing device 120. For example, the exemplary workplace store 140, in such an aspect, could be communicationally coupled to one or more email server computing devices, or other like server computing devices that are independent of the document server computing device 120.

For purposes of the mechanisms described herein, among other information, each workspace can have stored therein activity indicators that can indicate a specific activity, or set of activities, performed on a document by users. Thus, the exemplary system 100 of FIG. 1 shows the exemplary user workspace 141 as comprising two different activity indicators namely the exemplary activity indicators 151 and 152. An application program being executed by a user corresponding to the user workspace 141, such as the exemplary user 111, can retrieve the activity indicators, such as the exemplary activity indicators 151 and 152, from the exemplary user workspace 141, and can utilize the information contained within the activity indicators to generate a user interface, such as the exemplary user interface 121, that can comprise not only documents recently accessed by the user 111, but also documents accessed by other users, such as the exemplary users 112 and 113. For example, if the exemplary activity indicator 151 is indicative of editing activity on the document 132 by the user 112, such as by using the word processing application program 118 on their personal computing device 115, the word processing application 117 can obtain such an activity indicator 151 from the exemplary workspace 141 and, based on the information contained therein, determine that a link to the document 132, either by itself or with other information about the document 132 can be presented as part of the exemplary user interface 121. Thus, the user 111 can be presented with an exemplary user interface 121 that comprises not only documents that the user 111 previously edited, such as the exemplary document 131, but can also comprise documents that other users, such as the exemplary user 112, also recently interacted with, such as the exemplary document 132.

Figure 2:
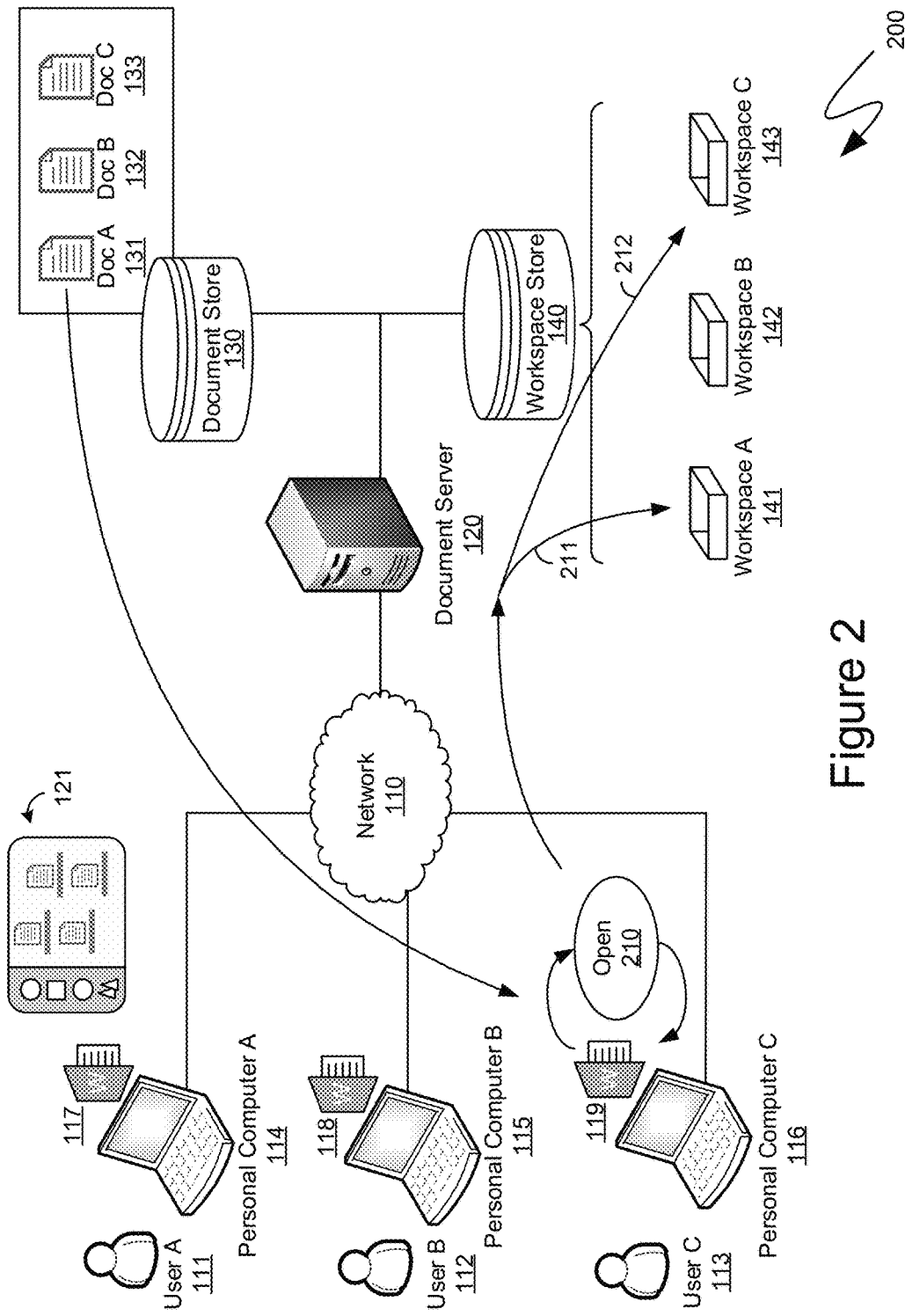
FIG. 2 is a system diagram of an exemplary system illustrating an aspect of the proactive distribution of document activity indicators.

Turning to FIG. 2, the exemplary system 200 shown therein illustrates an exemplary mechanism for populating user workspaces, such as the exemplary workspaces 141, 142 and 143. Within the exemplary system 200, the user 113 is illustrated as utilizing the word processing application program 119, on their personal computing device, namely the exemplary personal computing device 116, to open the document 131, as illustrated by the open action 210. For purposes of illustrating an exemplary mechanism for populating user workspaces with document activity indicators, within the example illustrated in FIG. 2, the document 131 can have been initially created by the user 111, and it can have been subsequently edited by the user 112, either by themselves, or in combination with edits from the user 111 as well. According to one aspect, the open document action 210, performed by the user 113 on the document 131, can be detected by the exemplary document server 120, such as when the exemplary document server 120 received the request from the word processing application 119, executing on the exemplary personal computing device 116, for the document 131.

Upon detecting the open document action 210, according to one aspect, activity indicators indicative of the open of the document 131 by the user 113 can be generated and provided to the workspaces of the user opening the document and the user who initially created the document, which can be thought of as a "master user". More specifically, according to one aspect, at least one user can have their workspace act as a definitive repository of document activity indicators of all of the activity corresponding to a particular document. Such a user can be termed a "master user" for that particular document, and that users workspace can termed a "master user workspace". According to one aspect, such a "master user" can be the user who initially created the document. According to another aspect, a "master user" can be explicitly established by one or more users, such as through user interfaces presented, either by content creation computer application programs themselves, or by document sharing utilities, collaboration facilitation utilities, or other like computer application programs.

Returning back to the exemplary system 200 of FIG. 2, based on the exemplary parameters defined above, where the document 131 can have been initially created by the user 111, the user 111 can be a "master user". Accordingly, document activity indicators indicative of the open action 210 can be distributed to user workspaces based on the type of action, namely the fact that it was a document open action, based on the user who initially created the document, namely the exemplary user 111, and based on the user who opened the document, triggering the generation of the document activity indicator indicative of the open action, namely the exemplary user 113. According to one aspect, document actions that are of the document open type can trigger the distribution of corresponding document activity indicators to the master user and to the user opening the document. Consequently, within the exemplary system 200 of FIG. 2, document activity indicators indicative of the open action 210 are illustrated as being distributed to the user workspace 141, corresponding to the user 111, as illustrated by the communication 211, as well as to the user workspace 143, corresponding to the user 113, as illustrated by the communication 212.

Figure 3:
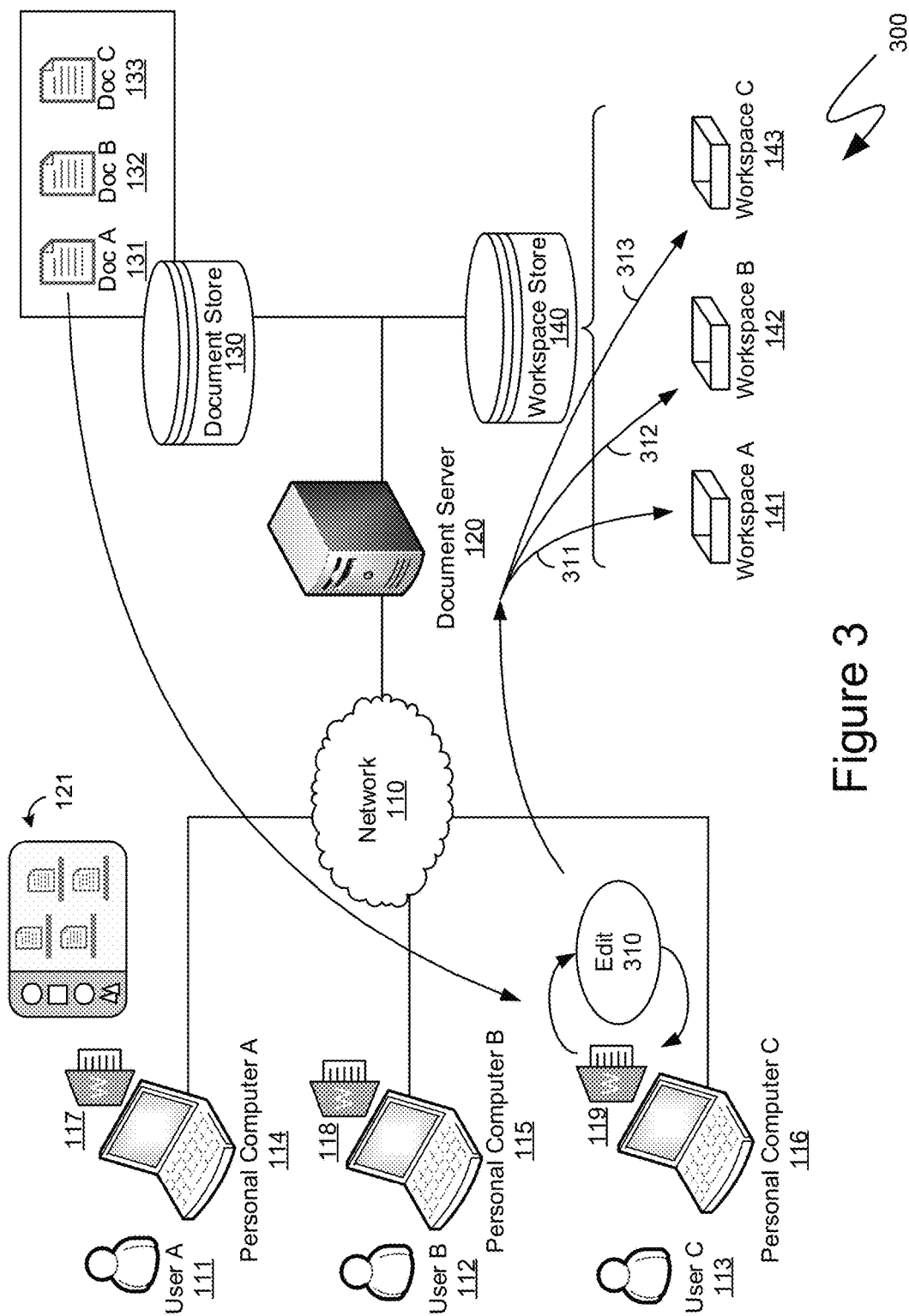
FIG. 3 is a system diagram of an exemplary system illustrating another aspect of the proactive distribution of document activity indicators.

Because the workspaces to which document activity indicators are distributed can be based on the type of document activity, other types of document activity can result in different types of distributions of the corresponding document activity indicators. For example, turning to FIG. 3, the exemplary system 300 shown therein illustrates the exemplary user 113 performing an edit action 310 on the exemplary document 131. Such an edit action 310 can be performed subsequent to the aforedescribed open action 210, in which case document activity indicators distributed in the manner illustrated of the exemplary system 300 of FIG. 3, and described herein, can be in addition to the document activity indicators indicative of the aforedescribed open action 210, whose distribution was detailed above.

According to one aspect, document activity indicators indicative of edit activity on a document can be distributed to all of the users who have previously edited that same document. Within the example illustrated by the system 300 of FIG. 3, the document 131 being edited by the user 113, as illustrated by the edit action 310, can have been initially created by the user 111, and can have been subsequently edited by the user 112. Consequently, the document activity indicator, that is indicative of the edit action 310, can be distributed to: (1) the workspace of the user performing the edit action 310, namely the workspace 143 corresponding to the user 113, (2) the workspace of the user who initially authored the document, namely the workspace 141 corresponding to the user 111, and (3) the workspaces of the users who have previously edited the document 131, such as, within the illustrated example, workspace 142 corresponding to the user 112. Such distribution of document activity indicators is illustrated by the arrows 313, 311 and 312, respectively.

According to other aspects, document activity indicators indicative of edit activity on a document can be distributed according to modified distribution criteria to that enumerated above. For example, rather than distributing document activity indicators to all of the users with previously edited that same document, the document activity indicators can be distributed to all of the users who previously edited that same document within a predetermined amount of time. For example, users who have edited the document within the last day, week, month, or any other like predetermined time interval can receive document activity indicators indicative of edit activity on that document, while other users who have edited the document outside of that predetermined time interval need not receive the document activity indicators indicative of edit activity on that document.

As another example, document activity indicators indicative of edit activity can be distributed to all of the users who previously opened that same document, irrespective of whether such users actually performed any edits on the document content itself, or its metadata. As before, such a pool of users can be reduced based on predetermined time intervals. Thus, for example, document activity indicators indicative of edit activity can be distributed to all of the users who previously opened that same document within the last day, week, month, or any other like predetermined time interval. Additionally, the predetermined time intervals can be separately established for users who have edited the document versus users who have merely opened the document to consume the content therein, without performing any edits, or who were prohibited from editing the document. For example, document activity indicators indicative of edit activity can be distributed to all of the users previously edited that same document within the last month, and can further be distributed to all of the users who previously opened that same document within the last week. Other predetermined time intervals can equally be utilized, with the time intervals for those users who have edited the document being set independently of the time intervals for those users who have only opened the document. Additionally, de-duplication processing can be utilized to avoid sending multiple document activity indicators indicative of the same edit activity to a same workspace, such as one document activity indicator indicative of edit activity being sent to a user's workspace because that user previously opened the document, and another, separate document activity indicator, indicative of that same edit activity, being sent to that same user's workspace because that user, in addition to previously opening the document, also edited the document while they had it open. Alternatively, such de-duplication need not be performed and multiple document activity indicators, even indicating the same activity, can simply remain in a user's workspace until obtained, such as by the content creation application program, which can then filter, or otherwise process such document activity indicators for purposes of generating a user interface, such as the "open" or "welcome" user interfaces detailed above.

As indicated previously, the workspaces to which document activity indicators are distributed can be based on the type of document activity. Another type of document activity can be the utilization of commenting functionality, or other analogous functionality, often provided by content creation computer application programs. According to one aspect, a user providing comments within a document, such as through such commenting functionality, can be treated in a manner analogous to that detailed above with respect to any other form of document content editing. Thus, for example, in the exemplary system 400 shown in FIG. 4, the comment action 410, performed by the user 113 on the document 131, can result in document activity indicators being distributed to the workspace 143, corresponding to the user 113 performing the editing/commenting, the workspace 141, corresponding to the user 111, who, in the current example, originally authored the document 131 in which the user 113 performed the comment action 410, and the workspace 142, corresponding to the user 112, who, in the current example, is a user who previously opened or edited the document such that, in accordance with preestablished criteria, they would be provided with a document activity indicator. The provision of such document activity indicators, indicative of the comment action 410, are illustrated by the arrows 413, 411 and 412, respectively, in the exemplary system 400 of FIG. 4.

According to one aspect, if a comment is not a general comment, but rather is a comment specifically directed to a particular individual user, or defined group of users, then, according to such an aspect, an additional document activity indicator can be generated and provided to the workspaces of those users to whom such comments are specifically directed. For example, the commenting functionality of certain content creation computer application programs can include the ability to programmatically reply to a prior comment made by another user. As another example certain content creation computer application programs can include the ability to programmatically direct comments or other edits specifically to individual users, or defined groups of users. The ability to programmatically direct feedback to specific users is sometimes triggered by the utilization of a specific symbol or keyword, such as the "@" symbol. Consequently, in some content creation computer application programs, the ability to programmatically direct feedback to specific users is referred to as "@mention", or other like terminology.

Figure 4:
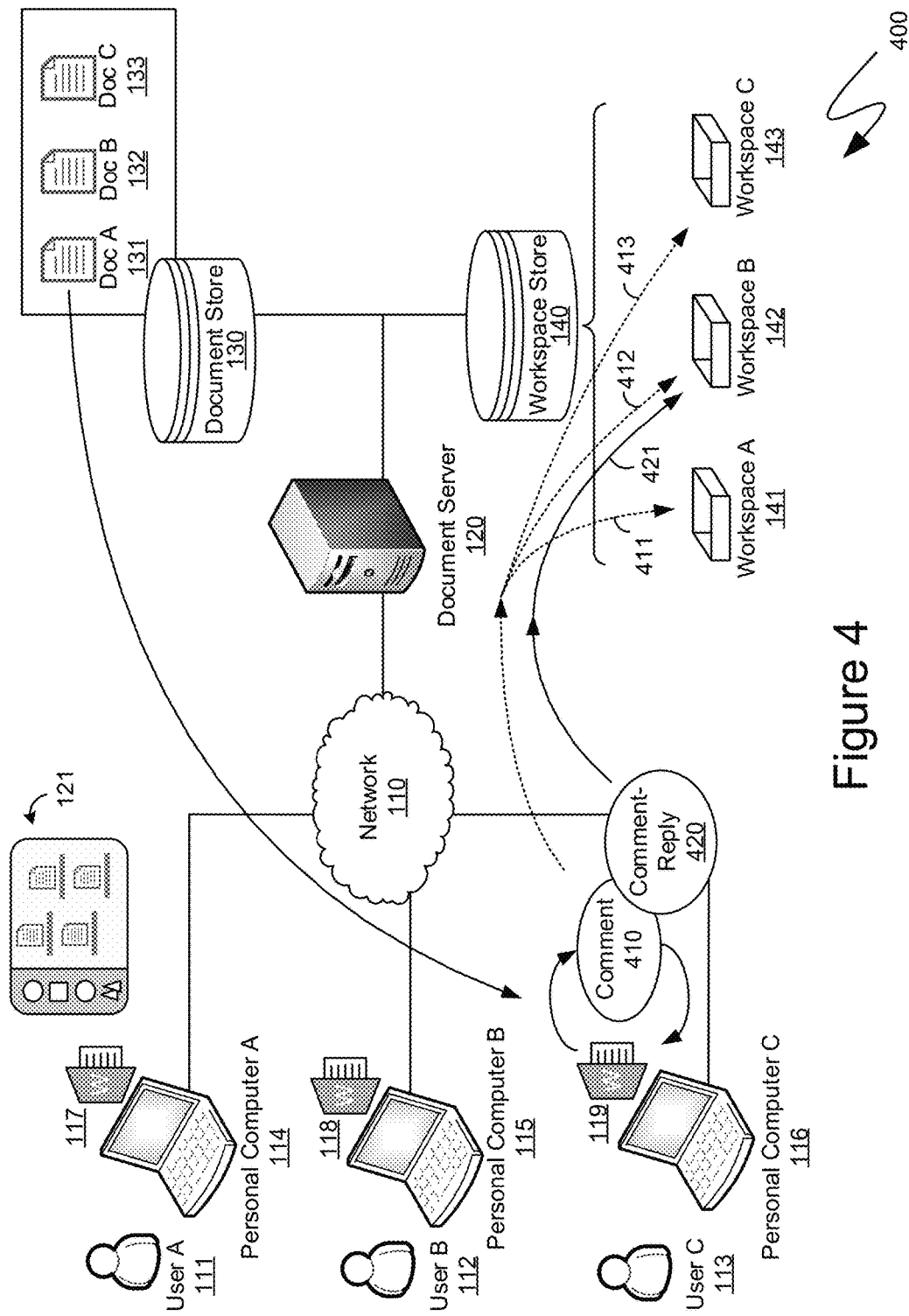
FIG. 4 is a system diagram of an exemplary system illustrating yet another aspect of the proactive distribution of document activity indicators.

Turning back to the exemplary system 400 shown in FIG. 4, the commenting action 410 is shown as comprising a comment-reply action 420 in which one of the comments made by the commenting action 410 is a reply to a specific user's prior comment. As illustrated by the exemplary system 400, such a comment reply action 420 can result in a separate document activity indicator, indicative of the targeted nature of the comment-reply action 420, to be distributed to the workspaces of the users identified by the comment-reply and to whom such a comment-reply action was directed. In the illustrated example, the exemplary comment-reply action 420 can have been a comment-reply to a comment previously made by the user 112. Accordingly, as illustrated by the arrow 421, the document activity indicator indicative of the comment reply action 420 can be provided to the workspace 142 corresponding to the user 112. Additionally, as illustrated by the arrows 412 and 421, the workspace 142 can receive both a document activity indicator indicative of the comment action 410, as well as a separate document activity indicator indicative of the comment-reply action 420.

Such multiple, separate document activity indicators can be utilized by content creation computer application programs to provide richer or more expressive user interfaces. For example, the word processing application 118, executing on the personal computing device 115, can retrieve both the document activity indicator indicative of the comment action 410 and the separate document activity indicator indicative of the comment reply-action 420, from the workspace 142 corresponding to the user 112. The word processing application 118 can then generate a user interface that proactively presents representation of the document 131 such that the user 112 can quickly select the document 131 to be opened, for example. Such a proactive presentation of a representation of the document 131 can be based on the document activity indicator indicative of the comment action 410. Additionally, the word processing application 118 can generate, based on the document activity indicator indicative of the comment-reply action 420, a user interface that further comprises an indication that the user 112 has received a reply to a prior comment made by such a user. Such an indication can be visually distinct from the proactive presentation of the representation of the document 131. In such a manner, as one example, different document activity indicators, even of related activities on a same document, can be utilized, such as to generate distinct user interface aspects or elements.

The programmatic directed feedback option, such as the aforementioned "@mention" functionality, provided by some content creation computer application programs can result in the generation and distribution of document activity indicators analogous to that described above with respect to the comment-reply action 420. More specifically, a directed feedback action can result in document activity indicators being generated specifically for the user at whom such a directed feedback is targeted. Additionally, a directed feedback action can also result in document activity indicators, including separate, distinct document activity indicators, being generated that are merely generally indicative of the existence of an edit in the form of a directed feedback, which can be delivered to multiple users' workspaces, including the workspace of the user who authored the document, the workspace of the user generating the directed feedback, and the workspaces of users who have opened or edited the document during a prior time.

Figure 5:
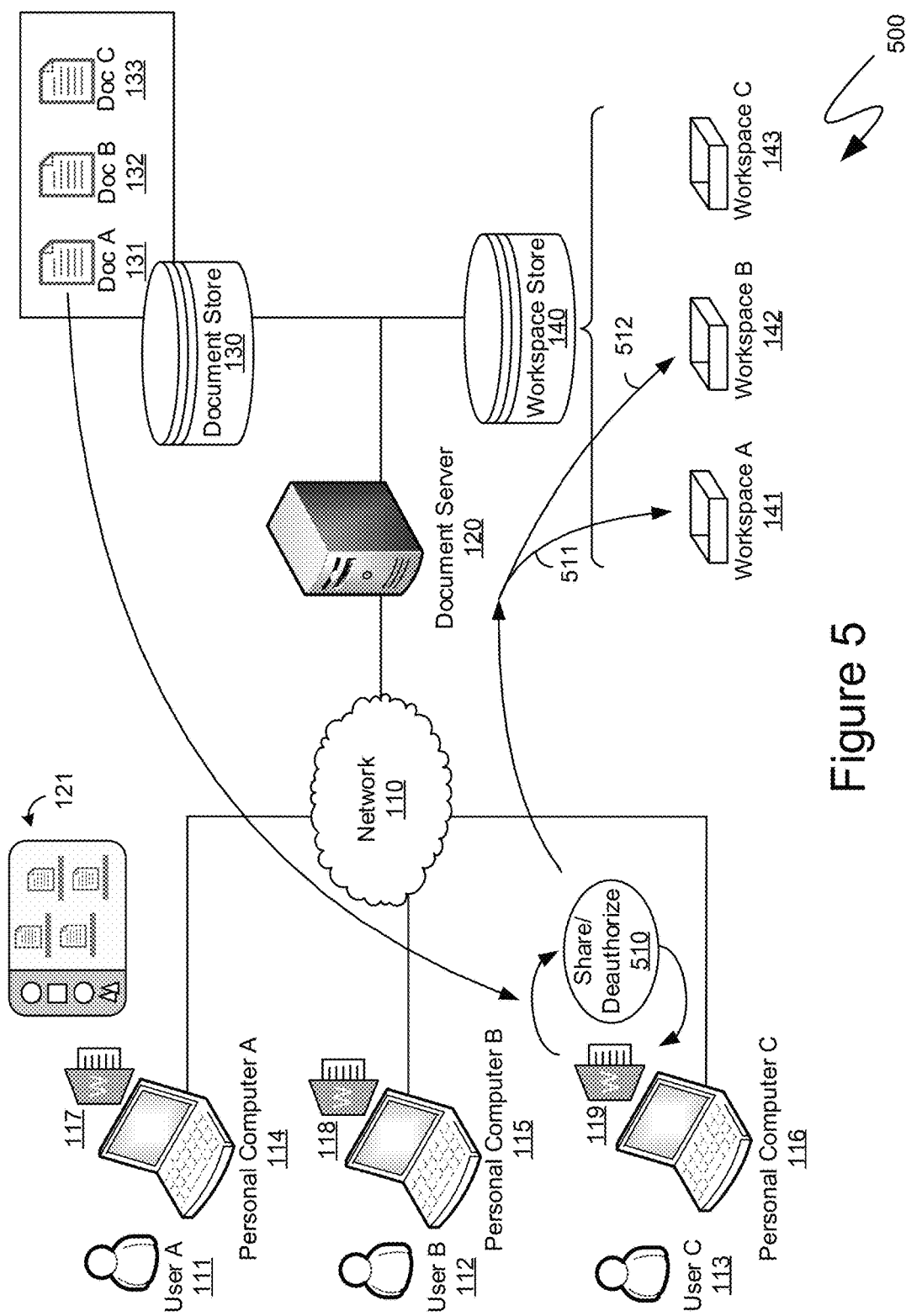
FIG. 5 is a system diagram of an exemplary system illustrating a further aspect of the proactive distribution of document activity indicators.

In addition to activity directed to the content of the document, such as that detailed above, document activity indicators can also be generated and distributed for activity directed to the metadata of the document, such as changes to the document name, changes to its file structure or type, and changes to the access permissions of such a document. For example, and turning to FIG. 5, the exemplary system 500 shown therein illustrates a user, such as the exemplary user 113, performing a share or de-authorize action 510 to either explicitly share the document 131 with another user, such as the exemplary user 112, who did not previously have access rights to such a document, or, alternatively, revoke that user's access rights to the document. According to one aspect, such a change in the access rights to the document can trigger the distribution of a corresponding document activity indicator to both the user whose access rights changed, as well as to the original author of the document. Thus, for example, if the exemplary user 113 explicitly shared the document 131 with the user 112, a document activity indicator indicative of such a sharing of the document to the user 112 can be generated and distributed to the workspace of the user 111, who, in the present example, can be the author of the document 131, as illustrated by the arrow 511. Additionally, a document activity indicator indicative that the document 131 was explicitly shared with the user 112 can be generated in distributed to the workspace of that user, namely the workspace 142, as illustrated by the arrow 512. According to other aspects, the user performing the sharing can also receive a document activity indicator, users who have previously been granted access, who have previously opened the document, who previously edited the document, or combinations thereof can also receive document activity indicators indicative of a sharing of the document with a new user.

In a similar manner, document activity indicators indicative of an explicit de-authorization can, likewise, be generated and distributed to the user whose access rights have been revoked and the original author of the document. Thus, for example, if the action 510 was a de-authorize action by which the exemplary user 113 removed the access rights of the exemplary user 112 and prevented the user 112 from further accessing the document 131, a document activity indicator corresponding to such a de-authorization action 510 can be generated and provided to the workspace 141, corresponding to the user 111, who, in the present example, is the author of the document, as well as to the workspace 142, corresponding to the user 112, who, in the present example, as had their access rights revoked by the de-authorization action 510. As before, according to other aspects, document activity indicators indicative of such a de-authorization can be provided to other users' workspaces, such as users who have previously been granted access, who have previously opened the document, have previously edited the document, the user performing the de-authorization, or combinations thereof.

According to one aspect, the users whose workspaces have document activity indicators distributed to them can include users who are selected based on their social relationship with the user performing the document activity, the original author of the document, or combinations thereof. Furthermore, the use of predefined social relationships to identify users to whose workspaces document activity indicators will be distributed can be performed in a staged, or iterative, process wherein the users to whose workspaces such document activity indicators are distributed can be selected based on their social relationships to users to whom such document activity indicators were distributed in a prior iteration. More specifically, a social graph can be constructed and maintained that can quantify, or otherwise delineate, relationships among multiple different users. The relationships delineated by such a social graph can include explicitly defined relationships, such as the relationships among users that have been placed within a single group, alias, or other like single reference within the context of digital communications. As another example of explicitly defined relationships, the relationships delineated by such a social graph can include managerial, organizational chart relationships, such as which users report to which managing users, each can be common in business environments. The relationships delineated by such a social graph can also include implicitly defined relationships, such as relationships identified by the actions of one or more users. For example, repeated instances of one user sharing documents with another user can result in a relationship being delineated between the two users by the social graph. As another example, repeated email communications between two users can result in a relationship being delineated between them by the social graph. As yet another example, users that are invited to the same meetings or events, such as through a shared calendaring service, can have a relationship delineated between them, based on such common meetings or events, by the social graph. The precise manner in which relationships between users are delineated in the social graph, and the precise manner in which the strength of those relationships is quantified, can be immaterial to the mechanisms described herein, since such a social graph is only utilized to identify other users, not otherwise identified, such as by the mechanisms detailed above, to whom document activity indicators can be distributed.

Figure 6:
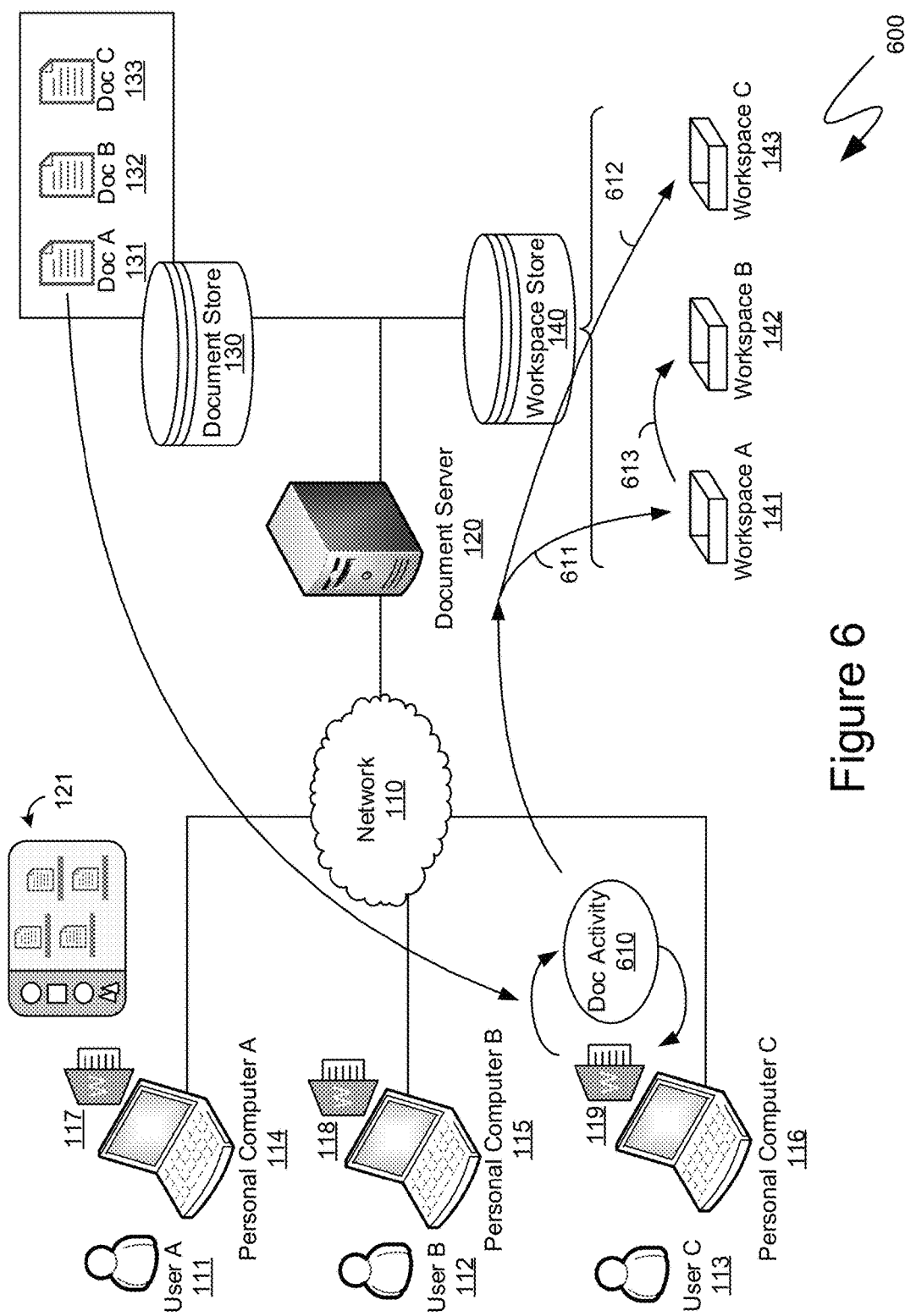
FIG. 6 is a system diagram of an exemplary system illustrating a still further aspect of the proactive distribution of document activity indicators

By way of a specific example, turning to FIG. 6, the exemplary system 600 shown therein illustrates an exemplary redistribution of document activity indicators in a staged manner to account for social connections among users. More specifically, the exemplary system 600 shows a document activity 610 being performed by the user 113 on the document 131. The document activity 610 can be any of the above described document activities, and can trigger, such as in accordance with the mechanisms detailed above, the distribution of document activity indicators to, for example, the workspace 141 and the workspace 143, as illustrated by the arrows 611 and 612. According to one aspect, after a document activity indicator is received at a workspace, a further evaluation can be performed to determine whether such a document activity indicator is to be further redistributed, such as in accordance with a social graph. Such a further evaluation can be performed by processes executing on one or more server computing devices, such as, for example, the exemplary document server computing device 120, by processes executing on individual ones of the personal computing devices such as, for example, processes executing on the exemplary personal computing device 114, which can access the workspace 141 corresponding to the user 111 that is utilizing the personal computing device 114, or combinations thereof.

The further evaluation can take into account users with whom the user 111, corresponding to the workspace 141, is socially connected, such as in the aforementioned social graph. Depending on the manner in which the social graph information is retained, the strength of relationship can be quantified, such that users having greater than a threshold strength of relationship can be identified to receive a further distribution of document activity indicators. Alternatively, or in addition, users having defined types of social relationships, such as a coworker relationship, a managerial relationship, a familial relationship, or other types of defined relationships can be identified to receive a further distribution of document activity indicators. In the example illustrated by the system 600 of FIG. 6, the user 112 can have been identified by the aforementioned processing as being connected to the user 111 the a social graph. For example, the user 112 can be a team member of the user 111, such that document activity indicators provided to the user 111 may potentially also be relevant to the user 112, even though the user 112 may not have previously opened or edited the document, such as the exemplary document 131, to which the activity triggering the document activity indicators was directed. In such an instance, the document activity indicator provided to the exemplary workspace 141, such as illustrated by the arrow 611 in FIG. 6 can be further redistributed to the exemplary workspace 142, corresponding to the user 112, as illustrated by the arrow 613.

According to one aspect, various information from the document activity indicator, or even from the document itself, can be referenced to determine users who are connected via a social graph to the user whose workspace received the document activity indicator, and to whom the document activity indicator is to be redistributed. For example, documents conforming to certain naming conventions, such as the use of certain keywords, numerical identifiers, or other like naming conventions, can have document activity indicators corresponding to activity on such documents be distributed to a set of coworkers. Consequently, the receipt, such as is exemplified by the arrow 611, of a document activity indicator indicating activity on a document having such a naming structure can result in the identification of other users that are part of a team, group, or other like collection of users, as identified in a social graph, such that the receipt of a document activity indicator to one of those users, such as, for example, the user 111, can trigger the redistribution of that document activity indicator to other users of that team, group, or other like collection of users, such as is exemplified by the arrow 613.

Figure 7:
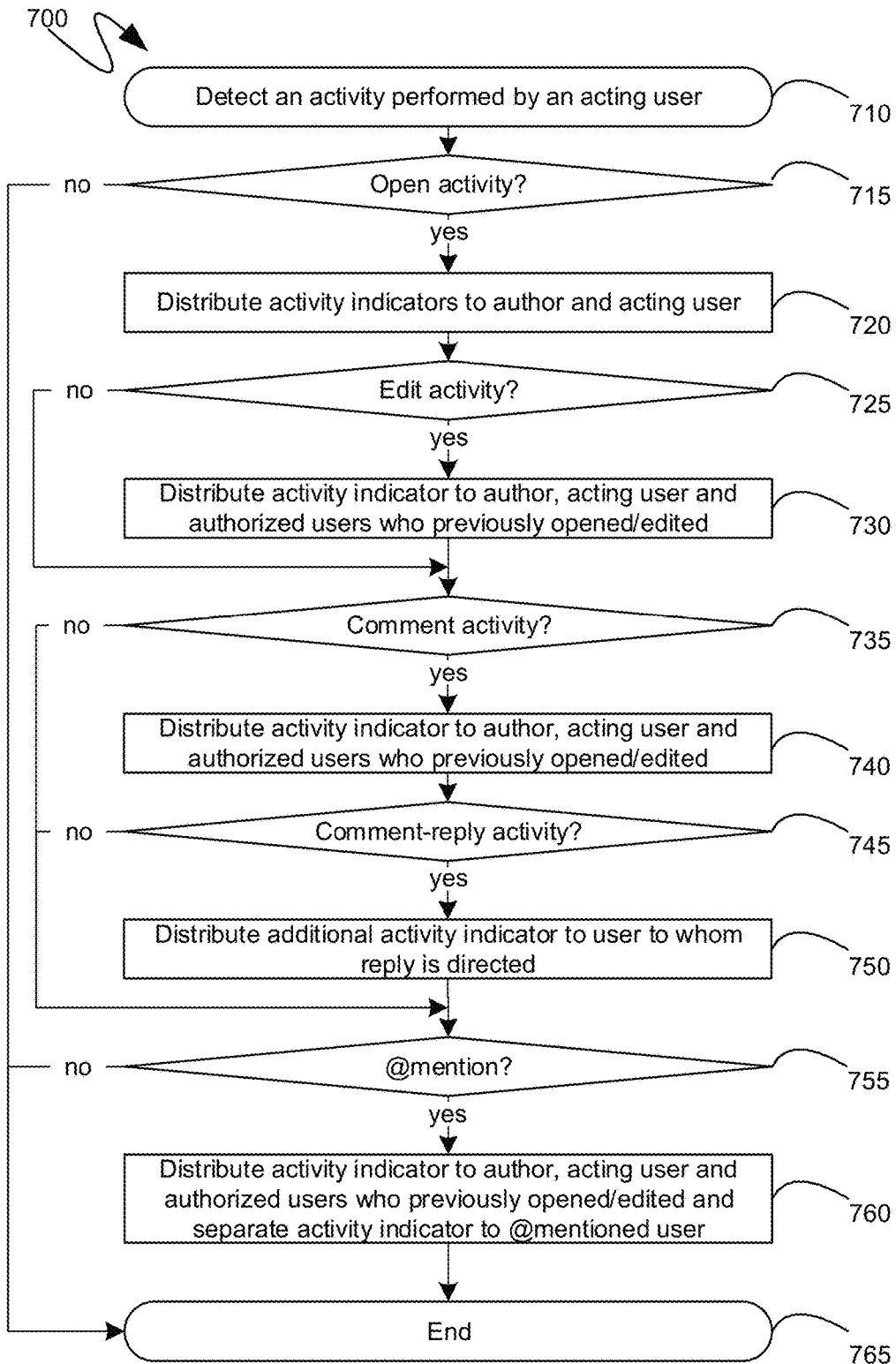
FIG. 7 is a flow diagram of an exemplary series of steps by which the proactive distribution of document activity indicators can be performed.

Turning to FIG. 7, the flow diagram 700 shown therein illustrates an exemplary series of steps by which the proactive distribution of document activity indicators can be performed in accordance with the type of activity such document activity indicators are indicative of More specifically, after an activity on a document is detected at step 710, processing can proceed to identify the type of document activity. For example, at step 715 a determination can be made as to whether such document activity is an open activity, and, if it is, a further determination can be made at step 725 as to whether such an opening of the document has also resulted in editing of the document, or, at step 735, a determination can be made as to whether such activity is a comment activity. While steps 715, 725, 735, 745 and 755 are shown as being performed in series, they can equally be performed in parallel, or through a single step that identifies an activity on a document as being one of a specific type.

Within the exemplary flow diagram 700 shown in FIG. 7, however, an initial determination can be made as to whether the activity performed in the document is an open activity, as illustrated by step 715. If, at step 715, it is determined that the document activity is not an open activity, then the activity may be of a sort for which a document activity indicator is not generated such as, for example, the moving of a document to a different storage location or the like, and, at step 765, the relevant processing can end. If, at step 715, however, it is determined that the document activity is a document open activity, processing can proceed to step 720 and activity indicators indicative of such open activity can be generated and distributed to the workspace corresponding to the author of the document, and to the workspace corresponding to the user acting on the document. Processing can then further proceed to step 725, at which point a further determination can be made as to whether the open activity of step 715 is also an edit activity. If, at step 725, it is determined that an edit was not performed, further processing can consider whether the activity was a comment activity, such as at step 735. Conversely, if, at step 725, it is determined that an edit activity was performed, processing can proceed to step 730 and activity indicators indicative of the edit activity can be distributed to the workspaces of the author, the user performing the activity, and authorized users who previously opened or edited the document, such as in the manner detailed above. As also indicated above, the activity indicators being distributed at step 730 can be in addition to the activity indicators of step 720, or they can be an alternative thereto.

At step 735, if the activity is not a comment activity, processing can proceed to step 755 to determine whether the activity is a programmatic response or targeted feedback, such as an "@mention". Conversely, if, at step 735, the activity is a comment activity, activity indicators can be distributed, at step 740, to the workspaces of the author, the user performing the comment activity, and authorized users previously opened or edited the document, again, as detailed previously. At step 745 a further determination can be made as to whether the comment activity of step 735 includes a targeted reply to a specific comment by a particular user, in which case processing can proceed to step 750 and additional activity indicators can be distributed to the workspace of the user to whom such replies directed. At step 755, if it is determined that the activity is an "@mention", or the like, activity indicators can be distributed to the workspaces of the author, the user performing such an "@mention", other authorized users who have previously opened or edited the document, with additional separate activity indicators being generated and provided to the workspace of the user who was "@mentioned". The relevant processing can then end at step 765.

Figure 8:
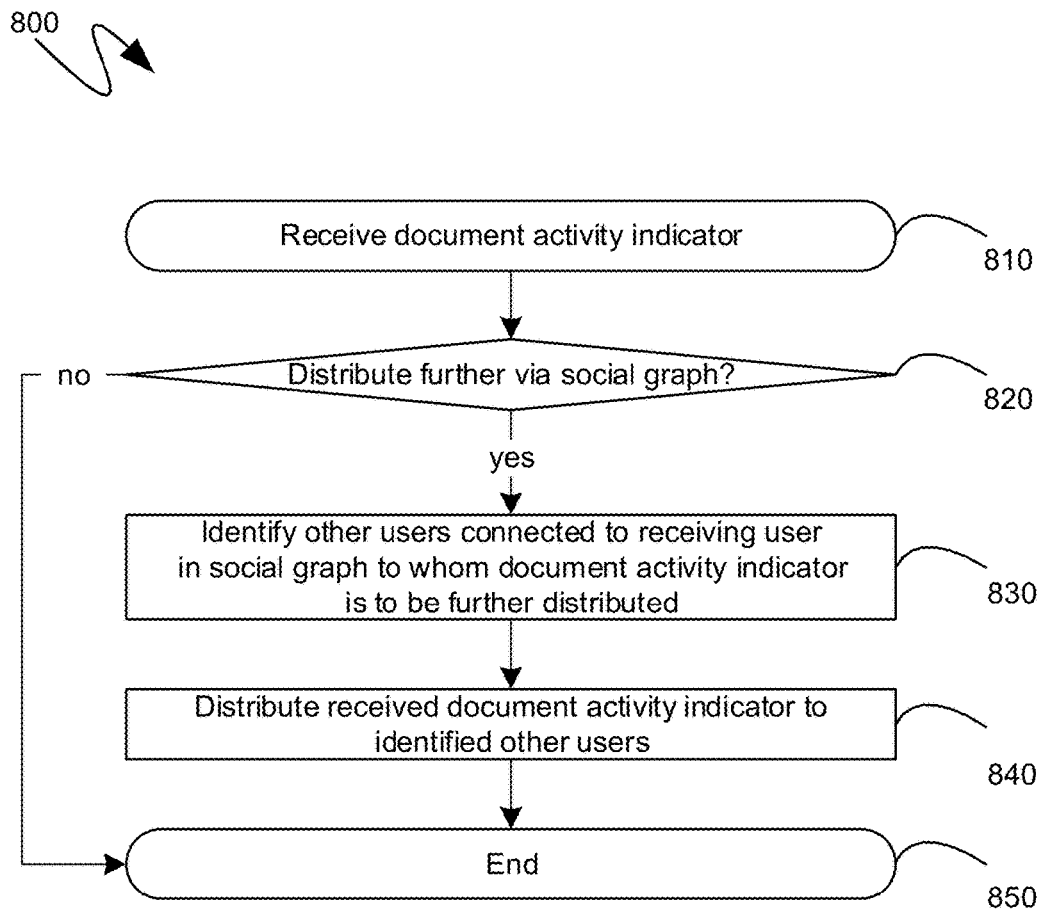
FIG. 8 is a flow diagram of an exemplary series of steps by which the proactive staged distribution of document activity indicators based on social connections can be performed.

Turning to FIG. 8, the exemplary flow diagram 800 shown therein illustrates a further series of steps that can be performed when a document activity indicator is received to proactively distribute such document activity indicators in a staged manner. More specifically, at step 810, a document activity indicator can be received. As indicated previously, the steps of the exemplary flow diagram 800 can be performed with processes executing on server computing devices, such as server computing devices having access to the user workspaces into which such document activity indicators would be distributed and received thereby. As also indicated previously, however, the steps of the exemplary flow diagram 800 can be performed with processes executing on remote, user computing devices, such as a user computing device on which is executing a content creation computer application program that can occasionally access a workspace corresponding to the user utilizing such a user computing device. After the document activity indicator has been received, such as at step 810, processing can proceed to step 820, wherein a determination can be made as to whether the received document activity indicator should be distributed further, such as via a social graph by which the user, in whose workspace the document activity indicator was received at step 810, is socially connected to other users, such as in the manner detailed above. If, at step 820, it is determined that further distribution of the document activity indicator received at step 810 should not be undertaken, then the relevant processing can end at step 850.

Conversely, if, at step 820, further distribution via the social graph is determined to be undertaken, then processing to proceed to step 830, at which other users, to whom the user in whose work space the document activity indicator was received at step 810, can be identified with reference to a social graph. As indicated previously, and identification of other users to whom to further distribute the document activity indicator received at step 810 can be undertaken based on a strength of relationship, a type of relationship, or other like relationship factors as quantified by the social graph. Additionally, as also indicated previously, the determination, at step 830, can be informed based upon information from the document activity indicator, such as a name of the document, its location within a shared folder, or other like information, as well as information from the document itself. Once the users identified at step 830 have been determined, the document activity indicator received at step 810 be further distributed to such users at step 840. The relevant processing can then end at step 850.

Figure 9:
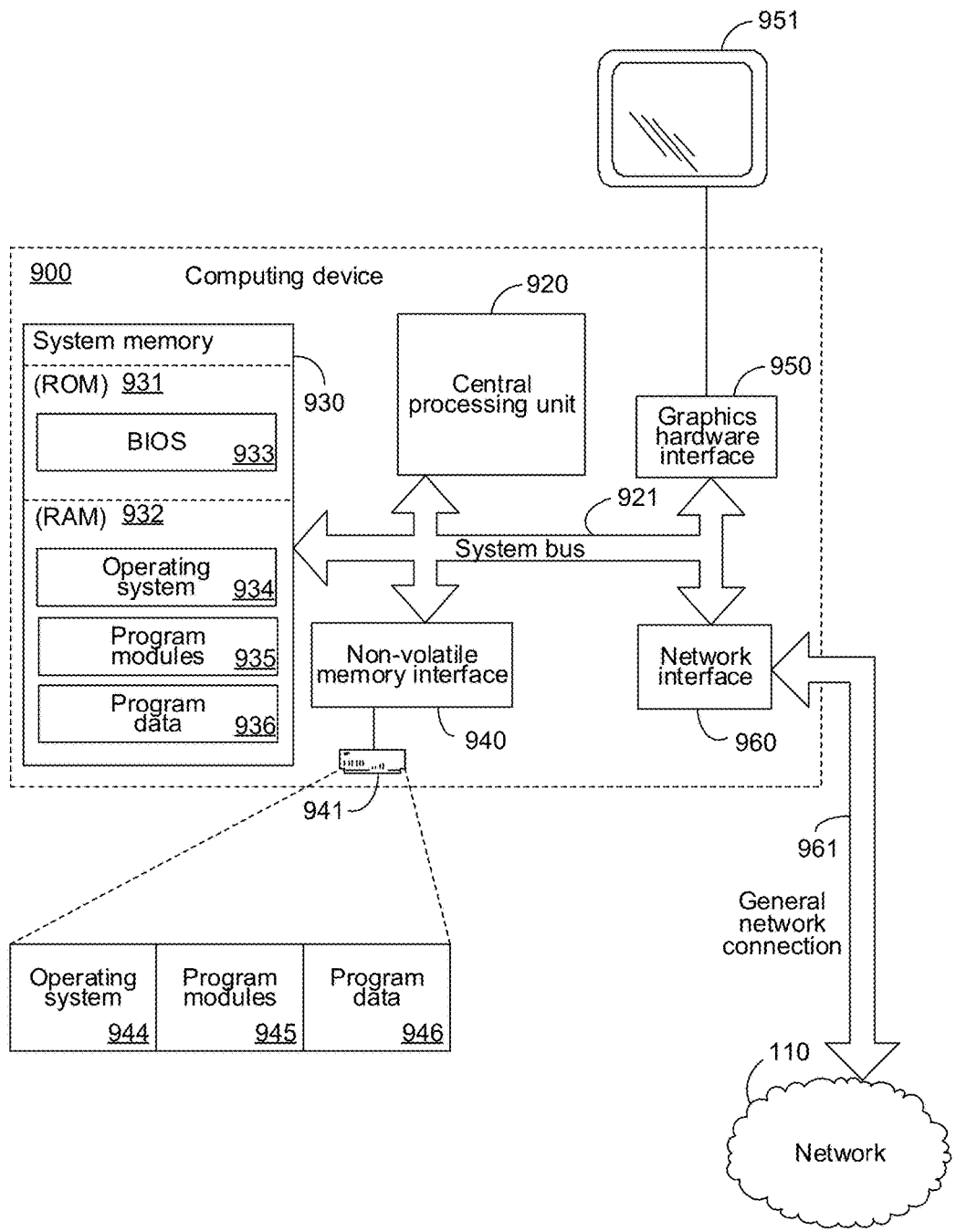
FIG. 9 is a block diagram of an exemplary computing device for implementing and/or utilizing proactive distribution of document activity indicators.

Turning to FIG. 9, an exemplary computing device 900 is illustrated which can perform some or all of the mechanisms and actions described above. The exemplary computing device 900 can include, but is not limited to, one or more central processing units (CPUs) 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. The computing device 900 can optionally include graphics hardware, including, but not limited to, a graphics hardware interface 950 and a display device 951, which can include display devices capable of receiving touch-based user input, such as a touch-sensitive, or multi-touch capable, display device. Depending on the specific physical implementation, one or more of the CPUs 920, the system memory 930 and other components of the computing device 900 can be physically co-located, such as on a single chip. In such a case, some or all of the system bus 921 can be nothing more than silicon pathways within a single chip structure and its illustration in FIG. 9 can be nothing more than notational convenience for the purpose of illustration.

The computing device 900 also typically includes computer readable media, which can include any available media that can be accessed by computing device 900 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 900. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer content between elements within computing device 900, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, other program modules 935, and program data 936.

The computing device 900 may also include other removable/non-removable, volatile/nonvolatile computer storage media. By way of example only, FIG. 9 illustrates a hard disk drive 941 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 941 is typically connected to the system bus 921 through a non-volatile memory interface such as interface 940.

The drives and their associated computer storage media discussed above and illustrated in FIG. 9, provide storage of computer readable instructions, data structures, program modules and other data for the computing device 900. In FIG. 9, for example, hard disk drive 941 is illustrated as storing operating system 944, other program modules 945, and program data 946. Note that these components can either be the same as or different from operating system 934, other program modules 935 and program data 946. Operating system 944, other program modules 945 and program data 946 are given different numbers hereto illustrate that, at a minimum, they are different copies.

The computing device 900 may operate in a networked environment using logical connections to one or more remote computers. The computing device 900 is illustrated as being connected to the general network connection 961 through a network interface or adapter 960, which is, in turn, connected to the system bus 921. In a networked environment, program modules depicted relative to the computing device 900, or portions or peripherals thereof, may be stored in the memory of one or more other computing devices that are communicatively coupled to the computing device 900 through the general network connection 961. It will be appreciated that the network connections shown are exemplary and other means of establishing a communications link between computing devices may be used.

Although described as a single physical device, the exemplary computing device 900 can be a virtual computing device, in which case the functionality of the above-described physical components, such as the CPU 920, the system memory 930, the network interface 960, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 900 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example a set of one or more computing devices, in aggregate comprising: one or more processing units; and one or more computer-readable media comprising computer-executable instructions which, when executed by the one or more processing units, cause the set of computing devices to: detect a first activity, performed by a first user, on a document created by a creator user; generate a first activity indicator corresponding to the first activity; identify a first set of users based on: changes to the document made by the first activity, a type of the first activity, the first user and the creator user; distribute the first activity indicator to a first set of user workspaces, each user workspace corresponding to one or more users in the identified first set of users; receive a request for activity indicators from a requesting user's workspace; and provide the activity indicators from the requesting user's zone in response to the request.

A second example is the set of computing devices of the first example, wherein the computer-executable instructions for identifying the first set of users comprise computer-executable instructions, which, when executed by the one or more processing units, cause the set of computing devices to identify the first set of users as comprising the first user and the creator user if the first activity is an open of the document by the first user.

A third example is the set of computing devices of the first example, wherein the computer-executable instructions for identifying the first set of users comprise computer-executable instructions, which, when executed by the one or more processing units, cause the set of computing devices to identify the first set of users as comprising the first user, the creator user, and currently authorized users who have previously opened the document if the first activity is an edit of the document by the first user.

A fourth example is the set of computing devices of the third example, wherein the currently authorized users who have previously opened the document that are identified as part of the first set of users are only those that have previously opened the document within a predetermined past amount of time.

A fifth example is the set of computing devices of the third example, wherein the currently authorized users who have previously opened the document that are identified as part of the first set of users are only those that have previously edited the document as well.

A sixth example is the set of computing devices of the first example, wherein the computer-executable instructions for identifying the first set of users comprise computer-executable instructions, which, when executed by the one or more processing units, cause the set of computing devices to identify the first set of users as comprising the first user, the creator user, and currently authorized users who have previously opened the document if the first activity is a comment on content of the document by the first user.

A seventh example is the set of computing devices of the sixth example, wherein the one or more computer-readable media comprise further computer-executable instructions, which, when executed by the one or more processing units, cause the set of computing devices to: identify, if the first activity is a comment reply, a replied-to user to whom the comment reply is directed; generate a second activity indicator corresponding to the first activity and indicating that the first activity is the comment reply to the replied-to user; and distribute the second activity indicator to a replied-to user workspace corresponding to the replied-to user; the replied-to user workspace also having the first activity indicator distributed to it.

An eighth example is the set of computing devices of the first example, wherein the computer-executable instructions for identifying the first set of users comprise computer-executable instructions, which, when executed by the one or more processing units, cause the set of computing devices to identify the first set of users as comprising the first user, the creator user, currently authorized users who have previously opened the document and a mentioned user if the first activity is a directed mention that is directed to the mentioned user, within a context of the document, by the first user.

A ninth example is the set of computing devices of the eighth example wherein the one or more computer-readable media comprise further computer-executable instructions, which, when executed by the one or more processing units, cause the set of computing devices to: generate a second activity indicator corresponding to the first activity and indicating that the first activity is the directed mention that is directed to the mentioned user; and distribute the second activity indicator to a mentioned user workspace corresponding to the mentioned user; the mentioned user workspace also having the first activity indicator distributed to it.

A tenth example is the computing device of the first example, wherein computer-executable instructions for identifying the first set of users comprise computer-executable instructions, which, when executed by the one or more processing units, cause the set of computing devices to identify the first set of users as comprising the creator user and a shared-with user if the first activity is a sharing of the document, by the first user, with the shared-with user.

An eleventh example is the computing device of the first examples, wherein the computer-executable instructions for identifying the first set of users comprise computer-executable instructions, which, when executed by the one or more processing units, cause the set of computing devices to identify the first set of users as comprising the creator user and a deauthorized user if the first activity is a change, by the first user, to access permissions associated with the document, revoking the deauthorized user's permission to access the document.

A twelfth example is the computing device of the first example, wherein the computer-executable instructions for identifying the first set of users comprise computer-executable instructions, which, when executed by the one or more processing units, cause the set of computing devices to identify the first set of users as comprising users socially directly connected to at least one of the first user or the creator user as identified in a pre-generated social graph.

A thirteenth example is the computing device of the first example, wherein the one or more computer-readable media comprise further computer-executable instructions, which, when executed by the one or more processing units, cause the set of computing devices to: separately detect a receipt of the first activity indicator at a second user workspace, corresponding to a second user, the second user workspace being part of the first set of user workspaces to which the first activity indicator was distributed; identify a second set of users comprising users socially directly connected to the second user as identified in a pre-generated social graph; and re-distribute the first activity indicator to a second set of user workspaces, each user workspace corresponding to one or more users in the identified second set of users.

A fourteenth example is a method of proactively distributing document activity indicators, the method comprising: detecting a first activity, performed by a first user, on a document created by a creator user; generating a first activity indicator corresponding to the first activity; identifying a first set of users based on: changes to the document made by the first activity, a type of the first activity, the first user and the creator user; distributing the first activity indicator to a first set of user workspaces, each user workspace corresponding to one or more users in the identified first set of users; receiving a request for activity indicators from a requesting user's workspace; and providing the activity indicators from the requesting user's zone in response to the request A fifteenth example is the method of the fourteenth example, wherein wherein the identifying the first set of users comprises identifying the first set of users as comprising the first user, the creator user, and currently authorized users who have previously opened the document if the first activity is either an edit of the document by the first user or a comment on content of the document by the first user.

A sixteenth example is the method of the fifteenth example, wherein further comprising: identifying, if the first activity is a comment reply, a replied-to user to whom the comment reply is directed; generating a second activity indicator corresponding to the first activity and indicating that the first activity is the comment reply to the replied-to user; and distributing the second activity indicator to a replied-to user workspace corresponding to the replied-to user; the replied-to user workspace also having the first activity indicator distributed to it.

A seventeenth example is the method of the fourteenth example, wherein the identifying the first set of users comprises identifying the first set of users as comprising users socially directly connected to at least one of the first user or the creator user as identified in a pre-generated social graph.

An eighteenth example is the method of the fourteenth example, wherein separately detecting a receipt of the first activity indicator at a second user workspace, corresponding to a second user, the second user workspace being part of the first set of user workspaces to which the first activity indicator was distributed; identifying a second set of users comprising users socially directly connected to the second user as identified in a pre-generated social graph; and re-distributing the first activity indicator to a second set of user workspaces, each user workspace corresponding to one or more users in the identified second set of users.

A nineteenth example is a system comprising: a first server computing device comprising: one or more first server processing units; and one or more first server computer-readable media comprising computer-executable instructions which, when executed by the one or more first server processing units, cause the first server computing device to: detect a first activity, performed by a first user, on a document created by a creator user; generate a first activity indicator corresponding to the first activity; identify a first set of users based on: changes to the document made by the first activity, a type of the first activity, the first user and the creator user, the first set of users comprising a second user; and distribute the first activity indicator to a first set of user workspaces, each user workspace corresponding to one or more users in the identified first set of users, the first set of user workspaces comprising a second user workspace corresponding to the second user; and a client computing device comprising: a display device; one or more client processing units; and one or more client computer-readable media comprising computer-executable instructions which, when executed by the one or more client processing units, cause the client computing device to: obtain, from the second user workspace, the first activity indicator; and generate, on the display device, a user interface visually presenting recent document activity to the second user based at least in part on activity indicators obtained from the second user workspace, the recent document activity comprising the first activity performed by the first user.

A twentieth example is the system of the nineteenth example, further comprising a second server computing device comprising: one or more second server processing units; and one or more second server computer-readable media comprising computer-executable instructions which, when executed by the one or more second server processing units, cause the second server computing device to: detect a receipt of the first activity indicator at the second user workspace; identify a second set of users comprising users socially directly connected to the second user as identified in a pre-generated social graph; and re-distribute the first activity indicator to a second set of user workspaces, each user workspace corresponding to one or more users in the identified second set of users.

As can be seen from the above descriptions, mechanisms for proactivity distributing document activity indicators, including in a staged manner, have been presented. In view of the many possible variations of the subject matter described herein, we claim as our invention all such embodiments as may come within the scope of the following claims and equivalents thereto.

We claim:

1. A set of one or more computing devices, in aggregate comprising:
   one or more processing units; and
   one or more computer-readable storage media comprising computer-executable instructions which, when executed by the one or more processing units, cause the set of computing devices to:
      detect a first activity, performed by a first user, on a document created by a creator user;
      generate a first activity indicator corresponding to the first activity;
      identify a first set of users based on: changes to the document made by the first activity, a type of the first activity, the first user and the creator user;
      distribute the first activity indicator to a first set of user workspaces, each user workspace corresponding to one or more users in the identified first set of users;
      receive a request for activity indicators from a requesting user's workspace; and
      provide the activity indicators from the requesting user's workspace in response to the request.

2. The set of computing devices of claim 1, wherein the computer-executable instructions for identifying the first set of users comprise computer-executable instructions, which, when executed by the one or more processing units, cause the set of computing devices to identify the first set of users as comprising the first user and the creator user if the first activity is an open of the document by the first user.

3. The set of computing devices of claim 1, wherein the computer-executable instructions for identifying the first set of users comprise computer-executable instructions, which, when executed by the one or more processing units, cause the set of computing devices to identify the first set of users as comprising the first user, the creator user, and currently authorized users who have previously opened the document if the first activity is an edit of the document by the first user.

4. The set of computing devices of claim 3, wherein the currently authorized users who have previously opened the document that are identified as part of the first set of users are only those that have previously opened the document within a predetermined past amount of time.

5. The set of computing devices of claim 3, wherein the currently authorized users who have previously opened the document that are identified as part of the first set of users are only those that have previously edited the document as well.

6. The set of computing devices of claim 1, wherein the computer-executable instructions for identifying the first set of users comprise computer-executable instructions, which, when executed by the one or more processing units, cause the set of computing devices to identify the first set of users as comprising the first user, the creator user, and currently authorized users who have previously opened the document if the first activity is a comment on content of the document by the first user.

7. The set of computing devices of claim 6, wherein the one or more computer-readable storage media comprise further computer-executable instructions, which, when executed by the one or more processing units, cause the set of computing devices to:
identify, if the first activity is a comment reply, a replied-to user to whom the comment reply is directed;
generate a second activity indicator corresponding to the first activity and indicating that the first activity is the comment reply to the replied-to user; and
distribute the second activity indicator to a replied-to user workspace corresponding to the replied-to user; the replied-to user workspace also having the first activity indicator distributed to it.

8. The set of computing devices of claim 1, wherein the computer-executable instructions for identifying the first set of users comprise computer-executable instructions, which, when executed by the one or more processing units, cause the set of computing devices to identify the first set of users as comprising the first user, the creator user, currently authorized users who have previously opened the document and a mentioned user if the first activity is a directed mention that is directed to the mentioned user, within a context of the document, by the first user.

9. The set of computing devices of claim 8, wherein the one or more computer-readable storage media comprise further computer-executable instructions, which, when executed by the one or more processing units, cause the set of computing devices to:
generate a second activity indicator corresponding to the first activity and indicating that the first activity is the directed mention that is directed to the mentioned user; and
distribute the second activity indicator to a mentioned user workspace corresponding to the mentioned user; the mentioned user workspace also having the first activity indicator distributed to it.

10. The set of computing devices of claim 1, wherein the computer-executable instructions for identifying the first set of users comprise computer-executable instructions, which, when executed by the one or more processing units, cause the set of computing devices to identify the first set of users as comprising the creator user and a shared-with user if the first activity is a sharing of the document, by the first user, with the shared-with user.

11. The set of computing devices of claim 1, wherein the computer-executable instructions for identifying the first set of users comprise computer-executable instructions, which, when executed by the one or more processing units, cause the set of computing devices to identify the first set of users as comprising the creator user and a deauthorized user if the first activity is a change, by the first user, to access permissions associated with the document, revoking the deauthorized user's permission to access the document.

12. The set of computing devices of claim 1, wherein the computer-executable instructions for identifying the first set of users comprise computer-executable instructions, which, when executed by the one or more processing units, cause the set of computing devices to identify the first set of users as comprising users socially directly connected to at least one of the first user or the creator user as identified in a pre-generated social graph.

13. The set of computing devices of claim 1, wherein the one or more computer-readable storage media comprise further computer-executable instructions, which, when executed by the one or more processing units, cause the set of computing devices to:
separately detect a receipt of the first activity indicator at a second user workspace, corresponding to a second user, the second user workspace being part of the first set of user workspaces to which the first activity indicator was distributed;
identify a second set of users comprising users socially directly connected to the second user as identified in a pre-generated social graph; and
re-distribute the first activity indicator to a second set of user workspaces, each user workspace corresponding to one or more users in the identified second set of users.

14. A method of proactively distributing document activity indicators, the method comprising:
detecting a first activity, performed by a first user, on a document created by a creator user;
generating a first activity indicator corresponding to the first activity;
identifying a first set of users based on: changes to the document made by the first activity, a type of the first activity, the first user and the creator user;
distributing the first activity indicator to a first set of user workspaces, each user workspace corresponding to one or more users in the identified first set of users;
receiving a request for activity indicators from a requesting user's workspace; and
providing the activity indicators from the requesting user's workspace in response to the request.

15. The method of claim 14, wherein the identifying the first set of users comprises identifying the first set of users as comprising the first user, the creator user, and currently authorized users who have previously opened the document if the first activity is either an edit of the document by the first user or a comment on content of the document by the first user.

16. The method of claim 15, further comprising:
identifying, if the first activity is a comment reply, a replied-to user to whom the comment reply is directed;
generating a second activity indicator corresponding to the first activity and indicating that the first activity is the comment reply to the replied-to user; and
distributing the second activity indicator to a replied-to user workspace corresponding to the replied-to user; the replied-to user workspace also having the first activity indicator distributed to it.

17. The method of claim 14, wherein the identifying the first set of users comprises identifying the first set of users as comprising users socially directly connected to at least one of the first user or the creator user as identified in a pre-generated social graph.

18. The method of claim 14, further comprising:
separately detecting a receipt of the first activity indicator at a second user workspace, corresponding to a second user, the second user workspace being part of the first set of user workspaces to which the first activity indicator was distributed;
identifying a second set of users comprising users socially directly connected to the second user as identified in a pre-generated social graph; and
re-distributing the first activity indicator to a second set of user workspaces, each user workspace corresponding to one or more users in the identified second set of users.

19. A system comprising:
a first server computing device comprising:
one or more first server processing units; and
one or more first server computer-readable storage media comprising computer-executable instructions which, when executed by the one or more first server processing units, cause the first server computing device to:
detect a first activity, performed by a first user, on a document created by a creator user;
generate a first activity indicator corresponding to the first activity;
identify a first set of users based on: changes to the document made by the first activity, a type of the first activity, the first user and the creator user, the first set of users comprising a second user; and
distribute the first activity indicator to a first set of user workspaces, each user workspace corresponding to one or more users in the identified first set of users, the first set of user workspaces comprising a second user workspace corresponding to the second user; and
a client computing device comprising:
a display device;
one or more client processing units; and
one or more client computer-readable storage media comprising computer-executable instructions which, when executed by the one or more client processing units, cause the client computing device to:
obtain, from the second user workspace, the first activity indicator; and
generate, on the display device, a user interface visually presenting recent document activity to the second user based at least in part on activity indicators obtained from the second user workspace, the recent document activity comprising the first activity performed by the first user.

20. The system of claim 19, further comprising a second server computing device comprising:
one or more second server processing units; and
one or more second server computer-readable storage media comprising computer-executable instructions which, when executed by the one or more second server processing units, cause the second server computing device to:
detect a receipt of the first activity indicator at the second user workspace;
identify a second set of users comprising users socially directly connected to the second user as identified in a pre-generated social graph; and
re-distribute the first activity indicator to a second set of user workspaces, each user workspace corresponding to one or more users in the identified second set of users.

* * * * *